Feb. 29, 1944.  A. DEWANDRE  2,342,727

GUN MOUNTING WITH SHOCK ABSORBERS

Filed Oct. 4, 1937

INVENTOR
A. Dewandre

By: Glascock Downing & Seebold
Attys.

Patented Feb. 29, 1944

2,342,727

UNITED STATES PATENT OFFICE 2,342,727

GUN MOUNTING WITH SHOCK ABSORBER

Albert Dewandre, Brussels, Belgium; vested in the Alien Property Custodian

Application October 4, 1937, Serial No. 167,311
In France October 8, 1936

1 Claim. (Cl. 89—42)

The shocks transmitted from machine guns to their mountings are often very heavy and cause injury to the parts of the mounting, and moreover, incommode the operator.

To attenuate the effect of those shocks, my invention has for its object to provide a gun mounting comprising a shock absorber.

According to my invention, the gun is assembled to its mounting by means of shackles the pins of which are rigidly connected to pivotal joints of elastical material, of the type known as "silentbloc," the arrangement being such that, under the effect of the recoil movement of the gun, the said shackles perform a limited rotation on their fulcrums, which movement is damped both during the recoil stroke and during the return stroke of the gun by the elastical material constituting the said joints.

A preferred embodiment of the invention will be hereinafter described by way of example with reference to the accompanying drawing, in which.

Figures 1, 2:
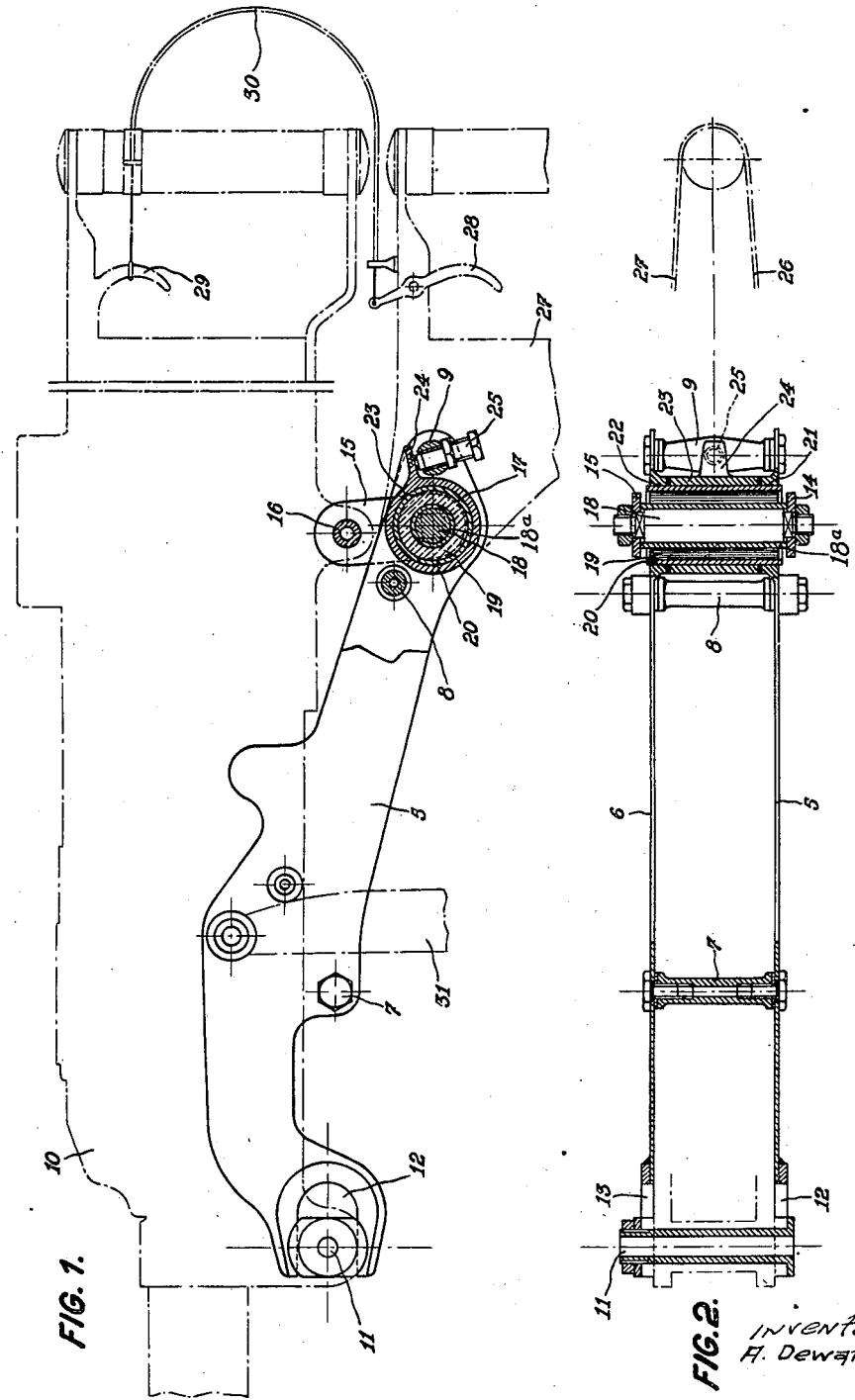
Fig. 1 is an elevation, partly in section, of the gun mounting.
Fig. 2 is a plan view, partly in section, of the said mounting.

As shown in the drawing, two cheeks 5 and 6 connected by stays 7, 8 and 9 are adapted to support the gun 10 by means of a pin 11 which is longitudinally movable in slots 12 and 13 formed at one end of the said cheeks, on the one hand, and through the medium of shackles 14, 15, on the other hand, the said shackles being in turn pivoted to the gun by the aid of a pin 16 forming a fulcrum, on the one hand, and to the said cheeks through an elastic connection 17, on the other hand.

The elastic connection is formed by a rubber bushing 19 provided between two coaxial sleeves 18a and 20, the tension of the rubber upon the cylindrical walls of the sleeves being such that the sliding of the bushing on said sleeve walls is prevented when a normal displacement of one of the sleeves relatively to the other occurs.

The sleeve 18a forms a connecting piece between the shackles 15 and 14 and is rigidly secured to the said shackles by means of a pin 18, while the sleeve 20 is guided in openings 21 and 22 provided in the lateral cheeks 5 and 6 respectively.

A collar 23 rigidly secured to the sleeve 20 is formed with a projection 24 cooperating with a set screw 25 carried by the stay 9 and adapted to prevent the sleeve 20 from rotating in the said openings 21 and 22, said screw providing for the adjustment of the initial stress put on the elastic bushing, as well as the adjustment of the initial angular position of the sleeve 20 relative to the sleeve 18a.

Owing to this arrangement, any angular motion of the shackles 14 and 15 due to the recoil of the gun is braked by the resilient action resulting from the distortion of the rubber bushing 19.

The object sought for in using rubber bushing connections of the "silentbloc" type is to take advantage of the particular elastical properties of such connections, which result in the elimination of return shock such as may be compared with the back-stroke produced by a metal spring when expanding as soon as the load is relieved.

According to the energy of the recoil to be damped, the opposing action of the resilient pivotal connection may be varied, as stated above, by initially twisting the rubber bushing, but said opposing action may also be increased by providing two or more pairs of shackles, each provided with such pivotal rubber bushing connection, between the gun and its support.

Independently of the elastic action of the bushing 19, on the shackles, to return the latter to their initial position, after angular displacement caused by the recoil of the machine gun, said bushing has the advantage of attenuating and even completely absorbing the transmission of kinetic energy of the vibrating masses to the gun support.

Owing to the fact that transmission of vibrations from the gun to the mounting is practically eliminated, the cheeks 5 and 6 may be extended in length by providing members 26 and 27, so as to form an operating handle for the gun, said handle supporting an actuating member 28 adapted to operate the trigger 29 of the gun through flexible transmission means 30. The gun mounting is universally supported at the end of a fork 31.

What I claim is:

A machine gun mounting of the character described, comprising a supporting frame having a slot for receiving the gun and for guiding the latter longitudinally, shackles connecting said gun to the support, said shackles being pivotally connected to said gun and to said support, one of said pivoted connections being displaceable angularly by the recoil of the gun, means on the support limiting the angular displacement of said last mentioned pivoted connection in the direction of firing, the pivotal connection between said shackles and said support including a pivot pin, two coaxial sleeves, one of said sleeves being rigidly secured to said pivot pin and the other being mounted on said first sleeve and rotatably in said support, a rubber bushing interposed between said sleeves under initial tension so as to resiliently oppose the angular displacements of the shackles under the action of the recoil of the gun and so as to constitute an elastic connection between the shackles and the support for absorbing the transmission of the vibrations of the gun to the support, an adjustable stop member on said support, cooperating with said last mentioned sleeve for imparting to the latter an initial angular displacement relative to the first sleeve in a direction opposite to that resulting from the recoil of the gun, whereby the rubber bushing will receive an initial twisting.

ALBERT DEWANDRE.